United States Patent Office 3,224,804
Patented Dec. 21, 1965

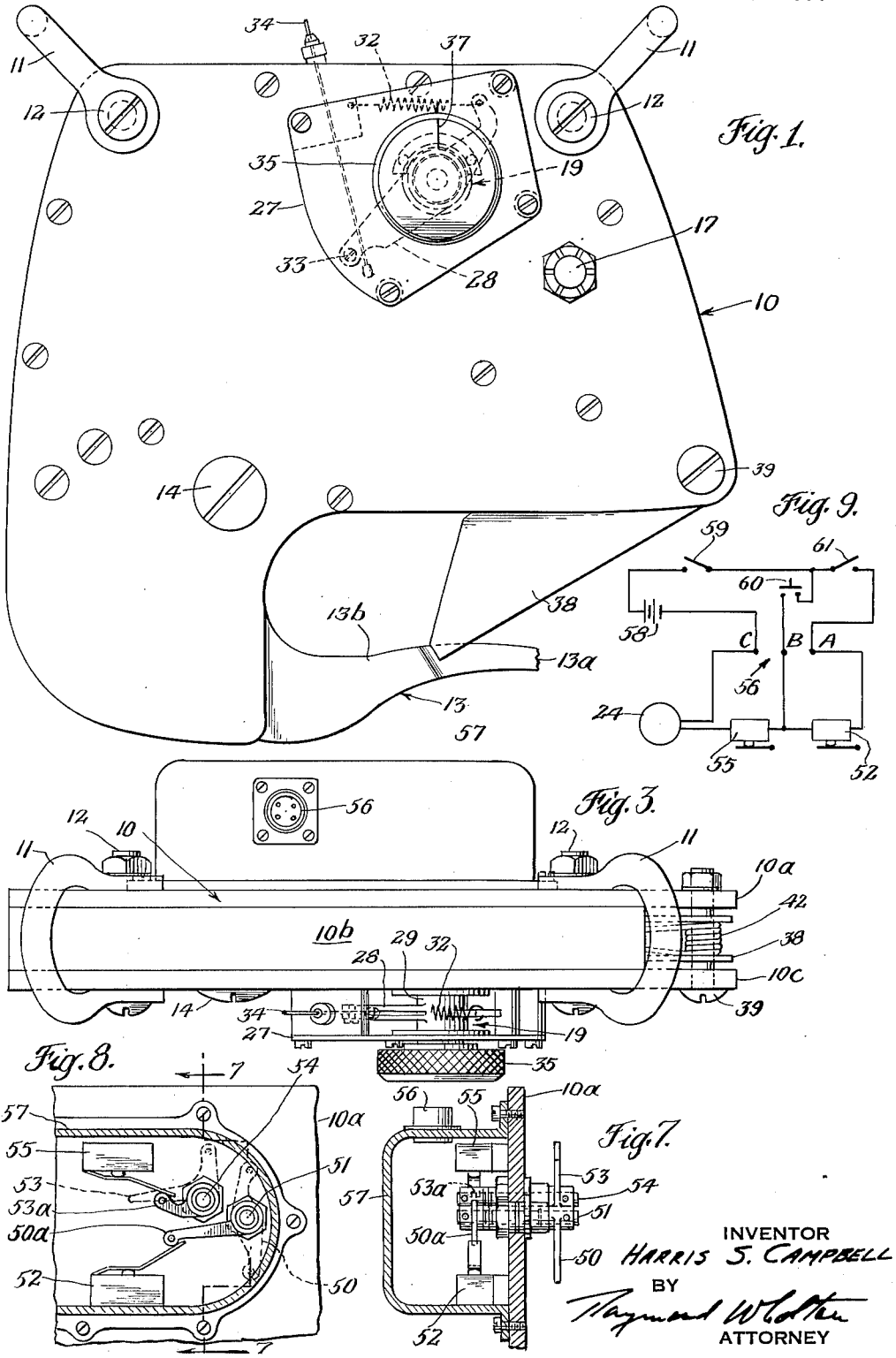

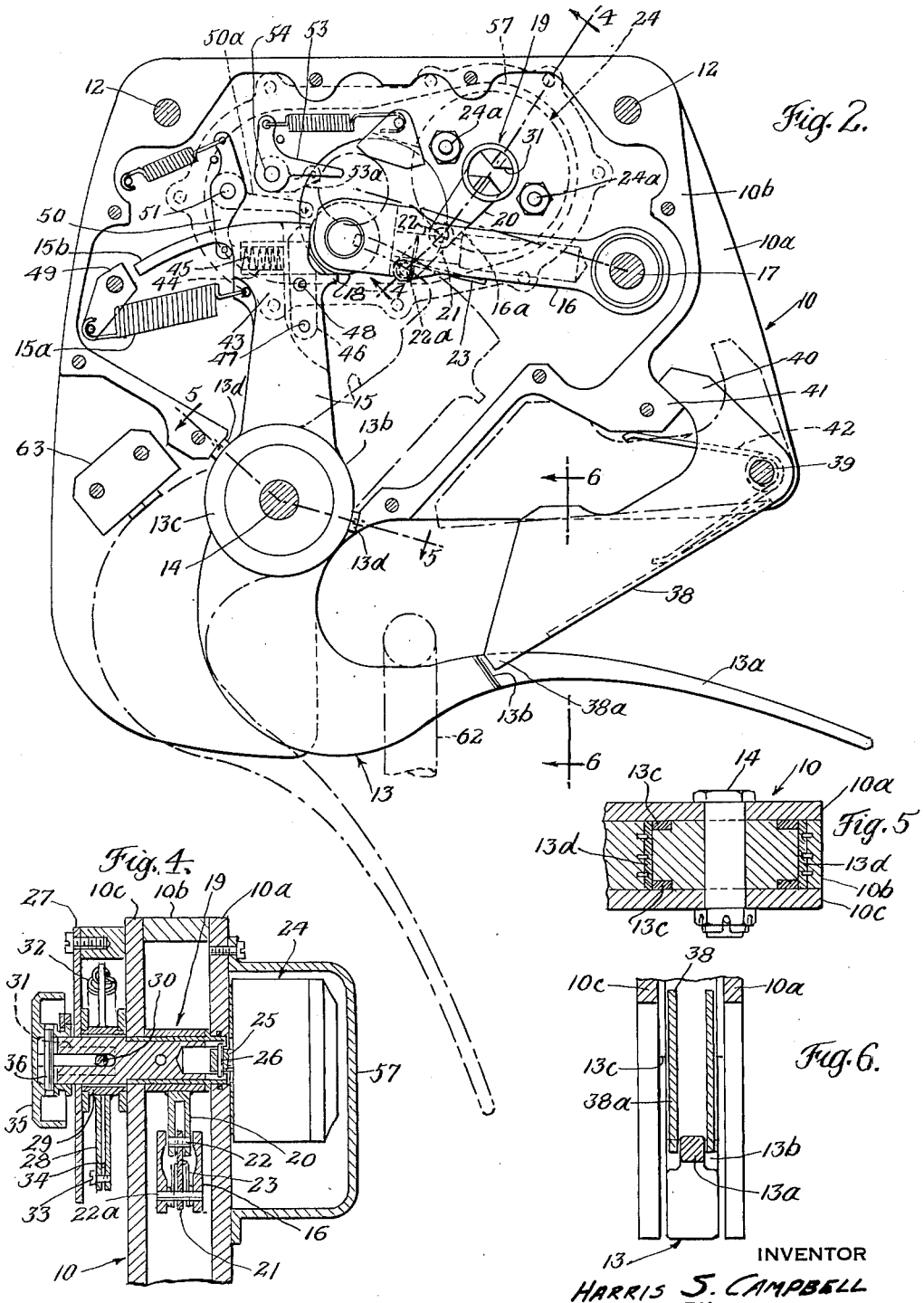

3,224,804
AUTOMATIC LOADING CARGO RELEASE
Harris S. Campbell, Bryn Athyn, Pa., assignor to Eastern Rotorcraft Corporation, Doylestown, Pa., a corporation of Pennsylvania
Filed July 25, 1963, Ser. No. 297,543
7 Claims. (Cl. 294—83)

This invention relates to cargo release hooks and is particularly concerned with improvements in the supporting and release mechanism therefor. Cargo release hooks of this nature are used primarily in connection with carrying external loads with a helicopter but they may also be used under special conditions with cranes, hoists or other equipment where a load release mechanism is desired.

One of the objects of the invention is to provide mechanism including a reaction member having one end supporting a roller member which engages a load carrying element and the other end of the strut pivotally mounted on the frame thereby providing for direct transfer of the holding loads from the load carrying member through the reaction strut.

A further object of the invention relates to the mechanism used for moving the reaction strut, which mechanism incorporates over dead center toggle linkage which provides for locking the reaction member securely in the supporting position.

Another object of the invention is the provision of improved releasing mechanism to permit the release of the load from the cargo hook when the load has reduced to the predetermined minimum value. This mechanism is used for automatic release of load upon touchdown of the slung load on the ground.

A further object of the invention is to provide improved arrangement for the manual releasing mechanism whereby a release arm is supported in the frame in an independent fashion with separate spring return. This mechanism permits movement of the release mechanism by the power means without disturbing the manually actuated means and further permits the manually actuated means to return to release position independently of the return of the main retention mechanism.

Another object of the invention is to provide an improved relationship between the load carrying beam and the load retention keeper to give greater reliability.

A further object is the provision of improved sealing arrangement when using a pivoted load carrying member having a portion inside the housing and a portion extending exposed outside the enclosed housing.

How the foregoing and other objects and advantages relating to the present invention are attained will be evident by reference to the drawings in which—

FIGURE 1 is an elevational view showing the general arrangement of a cargo release hook according to the present invention.

FIGURE 2 is a view generally similar to FIGURE 1 but with the cover parts removed to show the interior mechanism.

FIGURE 3 is a plan view taken from the upper side of the cargo hook as seen in FIGURE 1.

FIGURE 4 is a sectional view taken along the lines 4—4 in FIGURE 2 showing the releasing shaft and the associated mechanism.

FIGURE 5 is a sectional view taken along lines 5—5 FIGURE 2 showing the sealing arrangement.

FIGURE 6 is a view taken in the direction of arrows 6—6 FIGURE 2 showing the keeper and beam relationship.

FIGURE 7 is a sectional view along the line 7—7 FIGURE 8 showing the switch actuator mounting.

FIGURE 8 is a rear view showing the electrical switch arrangement.

FIGURE 9 is a diagram of an electrical system suitable for use with the cargo hook.

From FIGURES 1–3 it will be seen that the cargo release hook incorporates a main frame or housing 10, including the back plate 10a, the peripheral spacer portion 10b which is preferably attached to the back plate by riveting or the like, and the front or cover plate 10c. The front plate 10c is removable by removing various bolts and screws to provide ready access to the interior mechanism as will be observed in FIGURE 2.

Shackles 11 may be attached to the upper corners of the release hook by bolts 12 or if desired the hook may be mounted directly on suitable supporting structure by bolts 12. A load carrying beam 13 is supported in the housing 10 by pivotal bolt 14. The beam 13 includes a forwardly extending nose portion 13a and an expanded portion 13b which is shaped to provide two arc shaped concentric surfaces about pivot 14 to assist in sealing the interior of the housing. As will be observed in FIGURE 5 sealing rings 13c and strip seals 13d provide for complete sealing between the beam and the housing while still allowing full freedom of swinging movement. Improved exclusion of dirt and moisture from the interior of the housing is thus obtained. The vertical surfaces of an upwardly extending arm 15 which is integral with the structure of beam 13 provides for holding the beam 13 in its horizontal load carrying position as shown in full lines, FIGURES 1 and 2. Return spring 15a serves to return arm 15 to position after displacement.

The beam 13 is held in the load carrying position by means of reaction strut 16 which is supported by pivot 17 in housing plates 10a and 10c. Strut 16 is provided with roller 18 which engages the upper portion of arm 15 to prevent movement thereof. To hold the reaction strut 16 in its load carrying position a shaft assembly 19 is supported in the housing plates 10a and 10c. Rigidly connected to shaft assembly 19 is a two part arm 20 (see also FIGURE 4) and a link 21 interconnects the end of arm 20 with the strut 16 by means of pivots 22 and 22a. With the parts in the full line position in FIGURE 2 the arm 20 and link 21 form a toggle structure which is urged to the over center position by a spring 23. The strut 16 is provided with a stop surface 16a to limit the over center position of arm 20.

Mounted on the outer surface of rear housing plate 10a is a power actuator 24 which in the present example is a rotary solenoid device having studs 24a holding it in position. A shaft 25 having limited angular movement extends from the actuator 24. Shaft 25 is connectible to shaft 19 by means of pin 26 which may engage a suitable slot in shaft assembly 19.

The shaft assembly 19 extends through the front housing plate 10c and also through the manual control housing plate 27 which is supported by suitable screws to the front plate 10c. Supported on housing 27 and front plate 10c is a manual control arm 28 which has an independently supported shaft 29. A pin 30 extends from shaft 29 through a lost motion slot 31 in shaft assembly 19 to permit arm 28 and shaft 29 to move shaft assembly 19 but to permit shaft 29 to return without returning shaft 19. Likewise shaft 19 may be moved in the opening direction without moving arm 28 and shaft 29. Arm 28 has a spring 32 connected to it to return it to normal position as shown in FIGURE 1. A suitable slot at the end of arm 28 and retaining screw 33 provide for attachment of a manual control cable 34 which may be used for remote manual control for releasing the cargo hook.

A manual knob 35 is connected to the outer end of shaft assembly 19 by a pin 36 which engages a mating slot. Suitable marks as indicated at 37 may be used on the knob and housing 27 to show the closed position of the shaft assembly 19.

Above the outer portion of the load carrying beam 13 a keeper member 38 is mounted on the housing 10 by pivot bolt 39. An arm portion 40 engages stop 41 formed in the peripheral housing part 10b. Spring 42 urges keeper member 38 to its full line closed position. The shape and relationship of the keeper 38 and the beam 13 and 13a are shown in FIGURE 6 where it will be seen that portion 13a is reduced in width at the section change position 13b and the terminal portions 38a fit snugly on each side of portion 13a with the outer surfaces of terminals 38a approximately flush with the surfaces of main beam portion 13. In this way there is less opportunity for a sling member on beam 13 to engage keeper 38 in a manner which might cause it to be inadvertently opened.

Automatic touchdown operation of the release hook may be provided by means of switch actuating mechanism supported at the end of arm 15. An enlarged portion 43 surrounds a cavity 44 in which the compression spring 45 is located. An actuator element or plate 46 is mounted by a pivot 47 in a suitable slot in arm 15. The actuator plate 46 is restricted to a limited movement by the limit stop pin 48. The arcuate arm extension 15b engages stop 49 in its limiting position. When only a small load remains on the beam 13 (e.g. 100 pounds) spring 45 pushes the arm 15 away from roller 18 till it engages the stop 49. This motion of arm 15 causes rotation of the actuator 50. As shown in FIGURES 7 and 8 actuator 50 is mounted on shaft 51 which extends through rear housing plate 10a where actuator 50a moves the switch 52 to provide for closing the circuit to the solenoid device.

Another actuator 53 is engaged by roller 18 when the reaction strut 16 moves upwardly to open position. This actuator 53 transmits its movement by means of shaft 54 to the rear actuator 53a which in turn operates safety switch 55 to open the circuit when the mechanism has opened thus protecting the solenoid from continued application of power.

It will be noted that the switches 52 and 55 and the electrical connections to the solenoid 24 and connector 56 are all contained within the solenoid device cover 57 which forms a waterproof compartment at the rear of rear housing plate 10a. The solenoid mounting and actuator shafts 51 and 54 are provided with suitable seals to prevent entry of water and thus the electrical system is protected in case of submersion.

FIGURE 9 shows the electrical wiring including the internal wiring system of the cargo release hook as well as a suitable external system for use therewith. The external system includes a source of power such as battery 58 with a wire from one terminal to connector terminal C and a lead from the other battery terminal to master switch 59 which in turn is connected to the operator's push button switch 60 with a lead to terminal B. Master switch 59 is also connected to arming switch 61 which is connected to terminal A.

The internal system has one connection for solenoid 24 connected to terminal C and the other solenoid device connection connected through safety switch 55 to terminal B. Safety switch 55 is normally closed. An alternate connection to the solenoid device extends from terminal A through touchdown switch 52 which is normally open and then through safety switch 55 to the solenoid.

In operation the release hook is attached to the lifting medium such as a helicopter being used to carry external cargo. Suitable electrical connections to provide the circuit described above provide for electrical operation and control. Also a manual control in the form of a cable member 34 extends from the release hook to the operator's station. The load may be attached to the load beam 13 by guiding a suitable sling member 62 over the nose portion 13a, past the movable keeper 38 and into carrying position on the beam 13.

When the load has been transferred to the deposit location it may be released from the hook in different ways at the selection of the operator.

To release electrically the operator will have the master switch 59 closed and at the proper instant will close the push button switch 61 which will energize the solenoid device 24 and cause rotation of shaft assembly 19 to swing arm 20 in a clockwise direction (FIGURE 2) to dotted outline position. This moves toggle link 21 and reaction strut 16 upwardly so that roller 18 no longer engages arm 15 with the result that the weight of the sling swings the beam 13 to open (dotted outline) position where it is clear of keeper 38 and allows the sling 62 to slide from the beam 13 thus disconnecting the load. The vertical surfaces of plates 10a and 10c adjacent the load carrying portion of the beam serve to guide the sling as it slides off the beam and prevents an angular pull relationship which might cause improper release. While the arm is in open position the beam 13 contacts limit stop 63 and the roller 18 rides on arcuate extension 15b thus holding the strut up until the spring 15a returns the arm 15 and beam 13 to normal position. During the opening motion as soon as the roller has reached its up position the switch 55 is opened to disconnect the circuit and protect the solenoid device in case the switch 60 is held closed for an extended period. With the safety switch, in the event the circuit is retained closed after release of the load, the strut 16 will flutter between open and closed position. However it will draw only a small fraction of the current produced by the stalled solenoid.

When automatic touchdown is to be used the operator closes the arming switch 61 slightly before touchdown is made. As the load is deposited in unloading position the weight is removed from the beam 13. As the weight reduces to a predetermined value the spring 45 acts to move the arm 13 slightly to move actuator 50 and thus touchdown switch 52 is closed. The circuit to the solenoid device 24 through switch 55 is thus completed and the device opens the strut 16 in the same fashion as for a normal electrical release. Again the weight of the sling opens the beam 13 and releases the load. The beam recloses and flutters as previously mentioned due to the safety switch operation. This occurs until the arming switch 61 is opened. This will normally be as soon as convenient after completing the touchdown release.

Under circumstances such as failure of the electrical system the load may be released mechanically by the operator through the medium of the manual control cable 34. In this case the operator applies tension to the cable to move it and arm 28 clockwise (FIGURE 1). This also moves the shaft assembly 19 by virtue of engagement of the pin 30 in the related slot 31 in the shaft assembly 19. The lost motion slot 31 permits the arm to immediately return to locked position under the influence of spring 32, the cable 34 also being returned as soon as tension is released. The shaft assembly is free to return to latched position as soon as the beam 13 is returned to load carrying position by spring 15a. It should also be noted that the solenoid device pin 26 also engages shaft assembly 19 by a similar lost motion slot. Thus both the solenoid device shaft 25 and the cable release arm 28 are mounted independently from the shaft assembly 19. Arm 28 moves only when it actuates the shaft assembly 19 and similarly the solenoid device shaft 25 moves only when it is actuating shaft assembly 19.

The knob 35 at the front of the housing is accessible so that the cargo hook may be opened manually at any time it is desired to do so. This knob also provides an indicator to show the open or closed position of the shaft assembly.

From the foregoing description it will be evident that I have provided a release hook mechanism with simple and rugged structure having improved operational features. The use of a latching mechanism in which a reaction strut engages directly on the beam structure permits simplified releasing by a shaft and toggle device. The use of the direct acting roller which may be equipped with a roller type bearing provides for operation under relatively light releasing forces. The independent mounting of the manual cable arm provides improved mechanical operation and assures positive return of the cable as soon as tension is released thus preventing malfunction of the cable control and undesirable effects on release operation. The independent mounting of the cable arm assures that no restriction on the power operation of the shaft occurs. The improved relationship of the load keeper and the load beam assures more positive retention of the sling in loaded position. The shape of the load beam member and the relationship with the sealing members assures improved resistance against the entry of dirt or moisture into the interior of the housing. The improved touchdown mechanism provides a more constant relationship with the load position resulting in more reliable operation. It is also protected from dust and corrosion which might contribute to malfunction.

I claim:

1. A cargo release hook having
   (a) a frame,
   (b) a load carrying beam pivotally mounted on said frame for swinging movement,
   (c) mechanism for releasably engaging said beam to support it in load carrying position including
      (1) a reaction strut pivotally supported on said frame and having a roller at one end,
      (2) a beam connected arm against which said roller engages when in load carrying position,
      (3) toggle linkage engaging said reaction strut to control its movement,
      (4) an electric actuating device mechanically engageable with the toggle linkage,
   (d) means for automatically releasing said mechanism upon reduction of the load on said beam to a predetermined value including
      (1) a spring loaded element supported on said arm at the roller engaging location,
      (2) an electrical switch having electrical connections to said electrical device
      (3) and a mechanical actuator for said switch responsive to movements between said arm and said spring loaded element.

2. A cargo release hook having
   (a) a frame,
   (b) a load carrying member pivotally supported in said frame,
   (c) said member having an arm portion extending beyond the pivotal support,
   (d) a reaction strut pivoted to said frame,
   (e) a roller at the end of said strut positioned to engage said arm portion when in load carrying position,
   (f) automatic load release mechanism responsive to the reduction of load on said load carrying member, said mechanism including
      (1) an electrical device connectible to said reaction strut,
      (2) an electrical switch connected electrically with said device,
      (3) a movable element supported on said arm,
      (4) a spring reacting between said element and said arm,
      (5) and a mechanical actuator engageable with said arm and said switch for transmitting movement caused by said spring to said switch.

3. A cargo release hook having
   (a) a frame having an internal closed portion having front and back walls and a peripheral wall extending between them,
   (b) a load carrying member having a pivot supporting it on said frame, said member having
      (1) an arm extending into the closed portion of said frame,
      (2) two arc shaped surfaces on said arm concentric with said pivot,
   (c) a sealing device including
      (1) a washer shaped element on each side of said arm having a radius substantially equal to said arc shaped surfaces,
      (2) a pair of transverse sealing members extending between said washer shaped elements and contacting said arc shaped surfaces of said arm and the peripheral walls of said frame.

4. A cargo release hook having
   (a) a frame,
   (b) a load carrying member having a pivot supporting it on said frame, said member having an arm extending from said pivot,
   (c) a retaining element pivotally supported on said frame and having a roller member mounted thereon, said roller being located to engage said arm near its end to restrain it against pivotal movement,
   (d) a spring loaded part mounted on said arm in alignment with said retaining element, said part and said arm being relatively movable in response to a load reduction in the load carrying member,
   (e) an electrical device connected to said retaining element,
   (f) an electrical switch supported on said frame having an electrical connection to said device,
   (g) an actuator for operating said switch actuable by the relative movement of said arm to provide for completing the electrical circuit to said device upon reduction of the load in said load carrying member to a predetermined value.

5. A cargo release hook having
   (a) a frame,
   (b) a load transmitting arm pivotally supported in said frame,
   (c) a load carrying beam connected to said arm,
   (d) a reaction member pivotally mounted on said frame,
   (e) a roller element mounted at one end of said reaction member in position to engage said arm near its end in a transverse direction when said arm is in loaded position,
   (f) a spring loaded part mounted on said arm in position to engage said roller, said part and said arm being relatively movable in response to a load reduction on said beam,
   (g) an electrical device having operating connections to said reaction member,
   (h) an electrical switch supported on said frame,
   (i) and means engageable with said arm and said switch to actuate said switch upon movement of said arm in response to load reduction.

6. A cargo release hook having
   (a) a frame,
   (b) a load beam structure pivotally supported in said frame for limited swinging movement, said beam structure having
      (1) a cantilever load carrying portion,
      (2) an arm portion extending upwardly into said frame,
   (c) mechanism for releasably engaging said arm portion to retain said beam structure in load carrying position including
      (1) a reaction strut having one end pivotally supported on said frame,
      (2) a roller mounted on said strut at the end opposite to the pivotally supported end, said roller engaging said arm portion to retain said beam structure in load carrying position,
      (3) toggle link means connected at one end to said strut,
      (4) a shaft pivotally mounted in said frame and connected to the other end of said toggle link means,
      (5) means for moving said shaft to move said link means to an untoggled position when said strut and roller are moved to non-reacting position to release said beam structure from load carrying position,
(6) a spring loaded element supported in said arm portion at the point of contact with said roller,
(7) and an actuator engaging said arm to provide for automatic release actuation under the arm movement caused by said element.

7. A cargo release hook having
(a) a housing formed by a pair of parallel plates with peripheral spacer means between them,
(b) a load beam structure pivotally supported in said housing for limited swinging movement, said beam structure having
   (1) a cantilever load carrying portion,
   (2) an arm portion integral with said load carrying portion extending into said housing,
   (3) means intermediate said arm portion and load carrying portion pivotally supporting said beam structure relative to said housing,
(c) mechanism for releasably engaging said arm portion to retain said beam structure in load carrying position including
   (1) a reaction strut having one end pivotally supported on said housing and having the other engageable with said arm portion remote from said load carrying portion,
   (2) a shaft offset from said strut pivotally supported between said parallel plates, with a portion projecting through one of said plates,
   (3) an arm attached to said shaft,
   (4) toggle link means pivotally supported between said arm and said strut,
   (5) a cable operated control arm supported independently on said plate through which the shaft portion projects and on the side of the plate outside said housing,
   (6) said control arm having a rotary lost motion connection with said shaft,
   (7) a spring connected to said control arm to urge said arm to closed position, and
   (8) means for actuating said shaft independently of said control arm having a rotary lost motion connection with said shaft.

References Cited by the Examiner

UNITED STATES PATENTS

| | | | |
|---|---|---|---|
| 905,576 | 12/1908 | Porter | 294—83 |
| 1,118,618 | 11/1914 | Babb | 24—241 |
| 1,324,676 | 12/1919 | Knudsen | 24—241 |
| 3,061,355 | 10/1962 | Cozzoli | 294—83 |
| 3,068,034 | 12/1962 | Campbell | 294—83.1 |
| 3,081,121 | 3/1963 | Campbell | 294—83.1 |

GERALD M. FORLENZA, *Primary Examiner.*

ERNEST A. FALLER, SAMUEL F. COLEMAN,
*Examiners.*